United States Patent
Konishi et al.

(10) Patent No.: US 8,709,656 B2
(45) Date of Patent: Apr. 29, 2014

(54) CATHODE MATERIAL FOR LITHIUM ION SECONDARY BATTERY AND LITHIUM ION SECONDARY BATTERY USING IT

(75) Inventors: Hiroaki Konishi, Hitachi (JP); Toyotaka Yuasa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 222 days.

(21) Appl. No.: 12/805,829

(22) Filed: Aug. 20, 2010

(65) Prior Publication Data

US 2011/0129734 A1  Jun. 2, 2011

(30) Foreign Application Priority Data

Nov. 27, 2009 (JP) ................. 2009-269403

(51) Int. Cl.
H01M 4/50 (2010.01)
H01M 4/505 (2010.01)
H01M 4/52 (2010.01)
H01M 4/525 (2010.01)

(52) U.S. Cl.
USPC .......... 429/223; 429/224; 429/231.5

(58) Field of Classification Search
USPC .............................. 429/121–347
See application file for complete search history.

(56) References Cited

U.S. PATENT DOCUMENTS

| 6,395,250 | B2 * | 5/2002 | Matsubara et al. | 423/594.4 |
| 2003/0180618 | A1 * | 9/2003 | Inoue et al. | 429/231.1 |
| 2004/0076882 | A1 * | 4/2004 | Hosoya et al. | 429/223 |

FOREIGN PATENT DOCUMENTS

| CN | 1960033 A | 5/2007 |
| JP | 2006-302880 | 11/2006 |
| JP | 2006-351378 | 12/2006 |
| JP | 2006-351379 | 12/2006 |
| JP | 2007-027100 | 2/2007 |
| JP | 2008-532221 A | 8/2008 |
| JP | 2009-054577 | 3/2009 |
| JP | 2009-117261 A | 5/2009 |
| JP | 2010-086693 | 4/2010 |
| WO | WO 2006/091019 A1 | 8/2006 |

OTHER PUBLICATIONS

CN office action of Appln. No. 201010569626.6 dated Jan. 14, 2013 with partial English translation.
JP Office Action of Appln. No. 2009-269403 dated Jul. 30, 2013 with partial English translation.

* cited by examiner

*Primary Examiner* — Kenneth Douyette
*Assistant Examiner* — James Lee
(74) *Attorney, Agent, or Firm* — Antonelli, Terry, Stout & Kraus, LLP.

(57) ABSTRACT

A lithium ion secondary battery according to the present invention uses a cathode material obtained by mixing a first cathode active substance represented by a compositional formula: $Li_{x1}Ni_{a1}Mn_{b1}CO_{c1}O_2$ (in which $0.2 \le x1 \le 1.2$, $0.6 \le a1 \le 0.9$, $0.05 \le b1 \le 0.3$, $0.05 \le c1 \le 0.3$, and $a1+b1+c1=1.0$); and a second cathode active substance represented by a compositional formula: $Li_{x2}Ni_{a2}Mn_{b2}CO_{c2}M_dO_2$ (in which $0.2 \le x2 \le 1.2$, $0.7 \le a2 \le 0.9$, $0.05 \le b2 \le 0.3$, $0.05 \le c2 \le 0.3$, M=Mo, W, $0 \le d \le 0.06$, and $a2+b2+c2+d=1.0$).

7 Claims, 1 Drawing Sheet

CATHODE MATERIAL FOR LITHIUM ION SECONDARY BATTERY AND LITHIUM ION SECONDARY BATTERY USING IT

CROSS-REFERENCE TO RELATED APPLICATION

This application is related to copending patent application Ser. No. 12/696,803, filed on Jan. 29, 2010 and entitled "Positive Electrode Material for Lithium Ion Secondary Battery and Lithium Ion Secondary Battery Using the Same" which claims priority from Japanese application JP-2009-045045 filed on Feb. 27, 2009.

BACKGROUND OF THE INVENTION

The present invention relates to a cathode material having high capacity, high output and high safety for a lithium ion secondary battery, and to a lithium ion secondary battery using it.

For the application of a lithium ion secondary battery to a battery for plug-in hybrid cars, it is necessary to decrease its cost, volume and weight and to have high output while high safety is maintained. For such purposes, cathode materials are required to have high capacity, high output and high safety.

In JP-A-2006-302880, cathode materials containing a nickel oxide or second lithium-nickel composite oxide are used on a surface of a lithium nickel composite oxide, and safety during internal short circuit is improved without hampering high rate characteristics at a low temperature of a lithium ion secondary battery. This cathode material has a high resistance since particles with high resistance are coated on a surface of a lithium nickel composite oxide. Therefore, a further investigation is required to attain the high output required for the battery for plug-in hybrid cars.

In JP-A-2006-351378, cathode materials are represented by a general formula: $Li_yNi_{1-w-x-y-z}CO_wCa_xMg_yM_zO_2$ (wherein, the element M contains at least one kind of an element selected from the group consisting of Mn, Al, B, W, Nb, Ta, In, Mo, Sn, Ti, Zr, and Y). In the cathode materials, Ca, Mg and M are more distributed on a surface layer part as compared with in the inside of the active substance particles, and the materials are used to improve the lifetime property. This cathode material has a high resistance since containing an element that is not involved in a reaction. Therefore, a further investigation is required to attain the high output required for the battery for plug-in hybrid cars.

In JP-A-2006-351379, there is used a cathode material containing at least one kind of compound containing an element selected from the group consisting of Mn, W, Nb, Ta, In, Mo, Zr, and Sn on a surface of a lithium nickel composite oxide and the lifetime property is improved. Also, this cathode material has a high resistance since containing an element that is not involved in a reaction. Therefore, a further investigation is required to attain the high output required for the battery for plug-in hybrid cars.

As can be seen the above discussion, in the above-described prior arts, a further investigation is required to attain the high capacity, high output and high safety required for the battery for plug-in hybrid cars simultaneously.

SUMMARY OF THE INVENTION

For the application of the lithium ion secondary battery to plug-in hybrid cars, high capacity, high output, and high safety are required to be attained simultaneously.

In the lithium ion secondary battery, such properties have a close concern with the nature of the cathode material.

In a layered cathode material represented by a compositional formula $LiMO_2$ (M: transition metal), increasing the Ni content in the transition metal layer is necessary for obtaining high capacity.

However, the cathode material of high Ni content has low structural stability during charging. When a battery temperature is elevated due to the heavy use of a battery, oxygen is released from the structure at a relatively low temperature and a significant exothermic reaction is caused. Therefore, ignition of the battery is required to be considered.

In view of the foregoing, it is an object of the present invention to provide a cathode material for a lithium ion secondary battery excellent in capacity, output, and heat stability and to provide the lithium ion secondary battery having excellent properties.

To accomplish the above-described objects, according to one aspect of the present invention, there is provided a cathode material for a lithium ion secondary battery. This cathode material includes: a first cathode active substance represented by a compositional formula: $Li_{x1}Ni_{a1}Mn_{b1}CO_{c1}O_2$ (in which $0.2 \leq x1 \leq 1.2$, $0.6 \leq a1 \leq 0.9$, $0.05 \leq b1 \leq 0.3$, $0.05 \leq c1 \leq 0.3$, and $a1+b1+c1=1.0$); and a second cathode active substance represented by a compositional formula: $Li_{x2}Ni_{a2}Mn_{b2}CO_{c2}M_dO_2$ (in which $0.2 \leq x2 \leq 1.2$, $0.7 \leq a2 \leq 0.9$, $0.05 \leq b2 \leq 0.3$, $0.05 \leq c2 \leq 0.3$, M=Mo, W, $0 \leq d \leq 0.06$, and $a2+b2+c2+d=1.0$).

An average secondary particle size of the first cathode active substance is preferably larger than that of the second cathode active substance. Further, Ni content of the first cathode active substance is preferably smaller than or equal to that of the second cathode active substance. The above-described facts permit a cathode material with higher safety to be provided.

A mixing ratio of the first cathode active substance contained in the cathode material is preferably set to 30 to 70% by mass.

An average secondary particle size of the second cathode active substance is preferably smaller than or equal to one half of that of the first cathode active substance.

Preferably, the Ni content a1 of the first cathode active substance is $0.7 \leq a1 \leq 0.8$, and the Ni content a2 of the second cathode active substance is $0.75 \leq a2 \leq 0.8$.

Further, the above-described cathode material for a lithium ion secondary battery is used for the cathode of the lithium ion secondary battery including: a cathode capable of occluding and discharging lithium, an anode capable of occluding and discharging lithium, and a separator and a non-aqueous electrolyte located between the cathode and the anode.

The present invention makes it possible to obtain the cathode material for a lithium ion secondary battery excellent in capacity, output, and heat stability, and provide the lithium ion secondary battery having excellent properties.

Other objects and advantages of the invention will become apparent from the following description of embodiments with reference to the accompanying drawings in which:

DETAILED DESCRIPTION OF THE INVENTION

Figure 1:
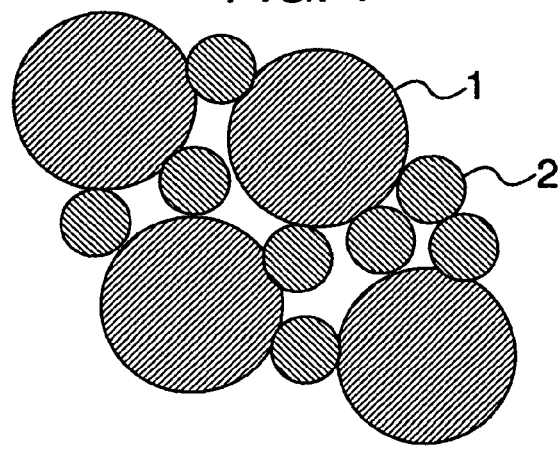
FIG. 1 is a schematic view illustrating a mixed state of two kinds of cathode active substances.

Features of the present invention will be described below with reference to embodiments.

A cathode material according to the embodiment includes a first cathode active substance represented by a compositional formula: $Li_{x1}Ni_{a1}Mn_{b1}Co_{c1}O_2$ (in which $0.2 \leq x1 \leq 1.2$, $0.6 \leq a1 \leq 0.9$, $0.05 \leq b1 \leq 0.3$, $0.05 \leq c1 \leq 0.3$, and $a1+b1+c1=1.0$); and a second cathode active substance represented by a compositional formula: $Li_{x2}Ni_{a2}Mn_{b2}CO_{c2}M_dO_2$ (in which $0.2 \leq x2 \leq 1.2$, $0.7 \leq a2 \leq 0.9$, $0.05 \leq b2 \leq 0.3$, $0.05 \leq c2 \leq 0.3$, M=Mo, W, $0 \leq d \leq 0.06$, and $a2+b2+c2+d=1.0$).

In the cathode active substance with high Ni content having added thereto Mo or W according to the embodiment, the amount of oxygen released from the cathode active substance at the time of elevating a temperature after elimination of lithium is below one half as compared with the cathode active substance with high Ni content not having added thereto Mo or W.

To cope with the above-described problem, when the cathode active substance with high Ni content having added thereto Mo or W is mixed into the cathode active substance with high Ni content not having added thereto Mo or W, there can be reduced the amount of oxygen released from the cathode active substance at the time of elevating a battery temperature. Therefore, there can be provided the cathode material for a lithium ion secondary battery in which the possibility that fire occurs at the time of elevating a battery temperature is reduced.

Further, an average secondary particle size of the first cathode active substance is made larger than that of the second cathode active substance. Since Mo or W are added to the second cathode active substance, its resistance increases. To cope with the above-described problem, for the application of the cathode material to a battery for plug-in hybrid cars, the average secondary particle size of the second cathode active substance is required to be reduced more than that of the first cathode active substance and to shorten a diffusion length of lithium.

A mixing ratio of the first cathode active substance contained in the cathode materials is set to 30 to 70% at mass ratio. When the mixing ratio is less than 30%, the capacity is reduced, whereas when the ratio is more than 70%, the amount of oxygen released the cathode active substance increases due to the raise of a battery temperature. That is, there is a problem in safety.

Further, the average secondary particle size of the second cathode active substance is set to below one half of that of the first cathode active substance. The reason is that when a particle size is reduced, a filling rate of the cathode material is improved.

The Ni content a1 of the first cathode active substance is $0.7 \leq a1 \leq 0.8$, and the Ni content a2 of the second cathode active substance is $0.75 \leq a2 \leq 0.8$. The reason is that when the Ni content of the transition metal layer is increased, the cathode material with high capacity can be provided.

Then, the Ni content of the first cathode active substance is reduced more than that of the second cathode active substance.

Using the above-described cathode material, the lithium ion secondary battery can be configured by a cathode capable of occluding and discharging lithium and an anode capable of occluding and discharging lithium through a separator and a non-aqueous electrolyte.

According to the embodiment of the present invention, as the cathode material, there is used a material obtained by mixing a first cathode active substance represented by a compositional formula: $Li_{x1}Ni_{a1}Mn_{b1}CO_{c1}O_2$ (in which $0.2 \leq x1 \leq 1.2$, $0.6 \leq a1 \leq 0.9$, $0.05 \leq b1 \leq 0.3$, $0.05 \leq c1 \leq 0.3$, and $a1+b1+c1=1.0$), and a second cathode active substance represented by a compositional formula: $Li_{x2}Ni_{a2}Mn_{b2}CO_{c2}M_dO_2$ (in which $0.2 \leq x2 \leq 1.2$, $0.7 \leq a2 \leq 0.9$, $0.05 \leq b2 \leq 0.3$, $0.05 \leq c2 \leq 0.3$, M=Mo, W, $0 \leq c1 \leq 0.06$, and $a2+b2+c2+d=1.0$).

The amount of Li of the first cathode active substance is defined as $0.2 \leq x \leq 1.2$, because the amount of Li present in the Li layer in a charged state is small and a layered crystal structure cannot be maintained when x1<0.2, and because the amount of the transition metal in the composite oxide is decreased to lower the capacity when 1.2<x1.

The amount of Ni is defined as $0.6 \leq a \leq 0.9$, because the Ni content that mainly contributes to the charge/discharge reaction is decreased to lower the capacity when a1<0.6.

The amount of Mn is defined as $0.05 \leq b1 \leq 0.3$, because the structure in a charged state is instable to lower the temperature at which oxygen is released from the cathode when b1<0.05, and because the content of Ni that mainly contributes to the charge/discharge reaction is decreased to lower the capacity when b1>0.3.

The amount of Co is defined as $0.05 \leq c1 \leq 0.3$, because the structure in the charged state is instable and the volume change of the cathode active substance is increased during charge/discharge when c1<0.05, and because the content of Ni that mainly contributes to the charge/discharge reaction is decreased to lower the capacity when c1>0.3.

The amount of Li of the second cathode active substance is defined as $0.2 \leq x2 \leq 1.2$, because the amount of Li present in the Li layer in a charged state is small and the layered crystal structure cannot be maintained when x2<0.2, and because the amount of the transition metal in the composite oxide is decreased to lower the capacity when 1.2<x2.

The amount of Ni is defined as $0.7 \leq a2 \leq 0.9$, because the content of Ni that mainly contributes to the charge/discharge reaction is decreased to lower the capacity when a2<0.7.

The amount of Mn is defined as $0.05 \leq b2 \leq 0.3$, because the structure in a charged state is instable to lower the temperature at which oxygen is released from the cathode when b2<0.05, and because the content of Ni that mainly contributes to the charge/discharge reaction is decreased to lower the capacity when b2>0.3.

The amount of Co is defined as $0.05 \leq c2 \leq 0.3$, because the structure in the charged state is instable and the volume change of the cathode active substance is increased during charge/discharge when c2<0.05, and because the content of Ni that mainly contributes to the charge/discharge reaction is decreased to lower the capacity when c2>0.3.

The amount of M is defined as $0 \leq d \leq 0.06$, because the content of Ni that mainly contributes to the charge/discharge reaction is decreased to lower the capacity when d>0.06.

Embodiment 1

(Preparation of Cathode Active Substance)

Nickel oxide, manganese dioxide, cobalt oxide, molybdenum oxide, and tungsten oxide were used as the starting material and, after weighing so as to obtain the predetermined atomic ratio, pure water was added to form a slurry.

The slurry was pulverized by a zirconia bead mill until the average particle size was 0.2 μm.

A polyvinyl alcohol (PVA) solution was added to the slurry by 1 wt % on the basis of the solid content ratio, and further, they were mixed for one hour and pelleted and dried by a spray dryer.

Lithium hydroxide and lithium carbonate were added to the pelleted particles such that a Li:(NiMnCo) ratio was 1.05:1.

Then, the powder was calcined at 850° C. for 10 hours to obtain crystals with a layered structure. Subsequently, they were crushed to obtain a cathode active substance 1-1 (refer to Table 1).

Further, after removing coarse particles each having a particle size of 30 μm or more by classification, the cathode active substance was used for the manufacture of an electrode.

A method for preparing the cathode active substance according to the embodiment is not limited to the above-described method, and other methods such as a coprecipitation method may be used.

Hereinafter, composition ratios of the synthesized transition metal composed of the first cathode active substance and the second cathode active substance are illustrated in the following Tables 1 and 2, respectively.

TABLE 1

First cathode active substance

| | Composition | | | Average secondary |
|---|---|---|---|---|
| | Ni | Mn | Co | particle size (μm) |
| 1-1 | 80 | 10 | 10 | 15.2 |
| 1-2 | 70 | 10 | 20 | 14.2 |
| 1-3 | 60 | 20 | 20 | 15.9 |
| 1-4 | 50 | 20 | 30 | 14.8 |

TABLE 2

Second cathode active substance

| | composition | | | | | Average secondary particle |
|---|---|---|---|---|---|---|
| | Ni | Mn | Co | Mo | W | size (μm) |
| 2-1 | 80 | 6 | 10 | 4 | — | 6.79 |
| 2-2 | 80 | 6 | 10 | 2 | — | 7.02 |
| 2-3 | 80 | 6 | 10 | 6 | — | 6.51 |
| 2-4 | 80 | 6 | 10 | — | 4 | 5.98 |
| 2-5 | 80 | 6 | 10 | — | 2 | 6.12 |
| 2-6 | 80 | 6 | 10 | — | 6 | 6.75 |
| 2-7 | 80 | 6 | 10 | — | 8 | 6.75 |
| 2-8 | 85 | 6 | 5 | 4 | — | 7.21 |
| 2-9 | 75 | 6 | 15 | 4 | — | 6.74 |
| 2-10 | 70 | 6 | 20 | 4 | — | 5.88 |
| 2-11 | 60 | 16 | 20 | 4 | — | 5.92 |
| 2-12 | 80 | 6 | 10 | 4 | — | 9.95 |
| 2-13 | 80 | 6 | 10 | 4 | — | 16.1 |

Table 1 (first cathode active substances 1-1 to 1-4) and Table 2 (second cathode active substances 2-1 to 2-11) illustrate composition ratios and average secondary particle sizes of the synthesized first cathode active substance (Ni, Mn, and Co) and second cathode active substance (Ni, Mn, Co, Mo, and W), respectively.

The cathode active substance 1-1 and a carbon-based conductive agent were weighed so as to obtain the mass ratio of 85:10.7, and the active substance and the conductive agent were composited by using mechanofusion. In this case, respective active substance and conductive agent may be composited by using an instrument such as a hybridizer.

The same operation was performed for the cathode active substances 2-1.

Next, two kinds of composited materials were mixed so as to obtain the mass ratio of 40:60. According to this method, the conductive agent can be dispersed highly on the surface of each of the active substances, thereby coating the surface of the particle with the conductive agent.

In the thus formed cathode materials, secondary particles 1 of the first cathode active substance and secondary particles 2 of the second cathode active substance are mixed as in a schematic view illustrating a mixed state of two kinds of the cathode active substances of FIG. 1.

As illustrated in FIG. 1, the secondary particles 2 of the second cathode active substance are then formed with smaller than the secondary particles 1 of the first cathode active substance.

Since the electronic conductivity is improved by the coating of this conductive agent, when it is used as the cathode material, high capacity can be maintained even if a large current is supplied.

Further, since the conductive agent is present between the active substances when different active substances are mixed, a conductive network is formed between the active substances and the ratio of isolated active substances not contributing to the charge/discharge reaction can be reduced and high capacity can be maintained.

On the other hand, when the two kinds of active substances and the conductive agent are mixed without compositing the active substances and the conductive agent, since the conductive agent is not coated on the surface of the respective active substances, the electronic conductivity is lowered.

Further, the mixed state of the respective active substances and the conductive agent is worsened, the formation of the conductive network between the active substances is made difficult, and the ratio of the isolated active substances is increased to decrease the capacity.

Subsequently, the mixed material of the two kinds of active substances and the conductive agent and a binder dissolved in NMP were mixed such that a mass ratio of the mixed material and the binder was 95.7:4.3.

After coating an aluminum current collector foil having a 20 μm thickness with the uniformly mixed slurry, it was dried at 120° C. and compression-molded by a press such that the electrode density was 2.7 g/cm$^3$.

Then, the molded product was punched out into a disk-shape of 15 mm diameter to manufacture a cathode.

A test battery was manufactured by using the thus-manufactured cathode, a metallic lithium for the anode, and a non-aqueous electrolyte (formed by dissolving 1.0 mol/liter of LiPF$_6$ to a mixed solvent of EC and DMC at a 1:2 volume ratio).

Further, in the test battery according to the present invention, the conductive agent, the binder, the anode, the electrolyte, and the electrolyte material to be used are not restricted to those described above but, for example, the followings may also be used.

The conductive agent includes graphite, acetylene black, and carbon black.

The binder includes polytetrafluoroethylene and rubber type binder.

The electrolyte includes ethylene carbonate, propylene carbonate, dimethyl carbonate, diethyl carbonate, methyl ethyl carbonate, γ-butyllactone, tetrahydrofurane, and dimethoxyethane.

The electrolyte material includes LiBF$_4$, LiClO$_4$, LiAsF$_6$, LiCF$_3$SO$_3$, and LiN(CF$_3$SO$_2$)$_2$.

Hereinafter, FIG. 3 illustrates mixing ratios of the first cathode active substances and the second cathode active substances.

TABLE 3

|  | First cathode active substance | Second cathode active substance | Mixing ratio |
| --- | --- | --- | --- |
| Embodiment 1 | 1-1 | 2-1 | 40:60 |
| Embodiment 2 | 1-1 | 2-2 | 40:60 |
| Embodiment 3 | 1-1 | 2-3 | 40:60 |
| Embodiment 4 | 1-1 | 2-4 | 40:60 |
| Embodiment 5 | 1-1 | 2-5 | 40:60 |
| Embodiment 6 | 1-1 | 2-6 | 40:60 |
| Embodiment 7 | 1-2 | 2-1 | 40:60 |
| Embodiment 8 | 1-3 | 2-1 | 40:60 |
| Embodiment 9 | 1-2 | 2-8 | 40:60 |
| Embodiment 10 | 1-2 | 2-9 | 40:60 |
| Embodiment 11 | 1-2 | 2-10 | 40:60 |
| Embodiment 12 | 1-1 | 2-1 | 30:70 |
| Embodiment 13 | 1-1 | 2-1 | 50:50 |
| Embodiment 14 | 1-1 | 2-1 | 70:30 |
| Embodiment 15 | 1-1 | 2-12 | 40:60 |
| Comp. Embodiment 1 | 1-2 | — | 100:0 |
| Comp. Embodiment 2 | 1-1 | — | 100:0 |
| Comp. Embodiment 3 | — | 2-1 | 0:100 |
| Comp. Embodiment 4 | 1-1 | 2-7 | 40:60 |
| Comp. Embodiment 5 | 1-3 | — | 100:0 |
| Comp. Embodiment 6 | 1-4 | 2-10 | 40:60 |
| Comp. Embodiment 7 | 1-2 | 2-11 | 40:60 |
| Comp. Embodiment 8 | 1-1 | 2-1 | 20:80 |
| Comp. Embodiment 9 | 1-1 | 2-1 | 80:20 |
| Comp. Embodiment 10 | 1-1 | 2-13 | 40:60 |

Table 3 illustrates Embodiments 1 to 13 and Comparative Embodiments 1 to 10.

The first cathode active substances illustrated in Table 3 are illustrated in Table 1, and the second cathode active substances illustrated in Table 3 are illustrated in Table 2. Further, the mixing ratios illustrated in Table 3 are those between the first cathode active substances and the second cathode active substances.

(Charge/Discharge Test)

Next, the following tests were performed by using the above-described test battery.

After charging the battery up to 4.3 V by constant current/constant voltage at a charge rate of 0.1 C, it was discharged up to 2.5 V by a constant current at a charge of 0.1 C.

(DSC (Differential Scanning Calorimetry) Measurement)

After charging the battery up to 4.3 V by constant current/constant voltage, the electrode was taken out of the test battery, washed with DMC and then punched out into a disk shape with a diameter of 3.5 mm, and placed in a sample pan. Then, after 1 μl of the electrolyte was added into the sample pan, it was tightly sealed.

The heat generating behavior of the specimen, when its temperature was elevated at 5° C./min, was examined.

(DC Resistance Measurement)

Further, the electrode resistance in a room temperature was measured by using the test battery. A constant current discharge is performed in the range where an open circuit voltage of the test battery is increased from 3.7 to 4.4 V, and the voltage at the time of discharge was recorded at an interval of 0.1 second.

Next, the voltage drop after 10 seconds from the open circuit voltage was measured and the electrode resistance was calculated.

Embodiment 2

In Embodiment 2, a test battery was manufactured by the same method as in Embodiment 1 except for mixing the prepared cathode active substances 1-1 and 2-2 at a mass ratio of 40:60 for use as the cathode active substance, and the charge/discharge test and the DSC measurement were performed.

Embodiment 3

In Embodiment 3, a test battery was manufactured by the same method as in Embodiment 1 except for mixing the prepared cathode active substances 1-1 and 2-3 at a mass ratio of 40:60 for use as the cathode active substance, and the charge/discharge test and the DSC measurement were performed.

Embodiment 4

In Embodiment 4, a test battery was manufactured by the same method as in Embodiment 1 except for mixing the prepared cathode active substances 1-1 and 2-4 at a mass ratio of 40:60 for use as the cathode active substance, and the charge/discharge test and the DSC measurement were performed.

Embodiment 5

In Embodiment 5, a test battery was manufactured by the same method as in Embodiment 1 except for mixing the prepared cathode active substances 1-1 and 2-5 at a mass ratio of 40:60 for use as the cathode active substance, and the charge/discharge test and the DSC measurement were performed.

Embodiment 6

In Embodiment 6, a test battery was manufactured by the same method as in Embodiment 1 except for mixing the prepared cathode active substances 1-1 and 2-6 at a mass ratio of 40:60 for use as the cathode active substance, and the charge/discharge test and the DSC measurement were performed.

Embodiment 7

In Embodiment 7, a test battery was manufactured by the same method as in Embodiment 1 except for mixing the prepared cathode active substances 1-2 and 2-1 at a mass ratio of 40:60 for use as the cathode active substance, and the charge/discharge test and the DSC measurement were performed.

Embodiment 8

In Embodiment 8, a test battery was manufactured by the same method as in Embodiment 1 except for mixing the prepared cathode active substances 1-3 and 2-1 at a mass ratio of 40:60 for use as the cathode active substance, and the charge/discharge test and the DSC measurement were performed.

Embodiment 9

In Embodiment 9, a test battery was manufactured by the same method as in Embodiment 1 except for mixing the prepared cathode active substances 1-2 and 2-8 at a mass ratio of 40:60 for use as the cathode active substance, and the charge/discharge test and the DSC measurement were performed.

Embodiment 10

In Embodiment 10, a test battery was manufactured by the same method as in Embodiment 1 except for mixing the prepared cathode active substances 1-2 and 2-9 at a mass ratio of 40:60 for use as the cathode active substance, and the charge/discharge test and the DSC measurement were performed.

Embodiment 11

In Embodiment 11, a test battery was manufactured by the same method as in Embodiment 1 except for mixing the prepared cathode active substances 1-1 and 2-10 at a mass ratio of 40:60 for use as the cathode active substance, and the charge/discharge test and the DSC measurement were performed.

Embodiment 12

In Embodiment 12, a test battery was manufactured by the same method as in Embodiment 1 except for mixing the prepared cathode active substances 1-1 and 2-1 at a mass ratio of 30:70 for use as the cathode active substance, and the charge/discharge test and the DSC measurement were performed.

Embodiment 13

In Embodiment 13, a test battery was manufactured by the same method as in Embodiment 1 except for mixing the prepared cathode active substances 1-1 and 2-1 at a mass ratio of 50:50 for use as the cathode active substance, and the charge/discharge test and the DSC measurement were performed.

Embodiment 14

In Embodiment 14, a test battery was manufactured by the same method as in Embodiment 1 except for mixing the prepared cathode active substances 1-1 and 2-1 at a mass ratio of 70:30 for use as the cathode active substance, and the charge/discharge test and the DSC measurement were performed.

Embodiment 15

In Embodiment 15, a test battery was manufactured by the same method as in Embodiment 1 except for mixing the prepared cathode active substances 1-1 and 2-12 at a mass ratio of 40:60 for use as the cathode active substance, and the charge/discharge test and the DSC measurement were performed.

Comparative Embodiment 1

In Comparative Embodiment 1, a test battery was manufactured by the same method as in Embodiment 1 except for using the prepared cathode active substance 1-2 for use as the cathode active substance, and the charge/discharge test and the DSC measurement were performed.

Comparative Embodiment 2

In comparative embodiment 2, a test battery was manufactured by the same method as in Embodiment 1 except for using the prepared cathode active substance 1-1 for use as the cathode active substance, and the charge/discharge test and the DSC measurement were performed.

Comparative Embodiment 3

In Comparative Embodiment 3, a test battery was manufactured by the same method as in Embodiment 1 except for using the prepared cathode active substance 2-1 for use as the cathode active substance, and the charge/discharge test and the DSC measurement were performed.

Comparative Embodiment 4

In Comparative Embodiment 4, a test battery was manufactured by the same method as in Embodiment 1 except for mixing the prepared cathode active substances 1-1 and 2-7 at a mass ratio of 40:60 for use as the cathode active substance, and the charge/discharge test and the DSC measurement were performed.

Comparative Embodiment 5

In Comparative Embodiment 5, a test battery was manufactured by the same method as in Embodiment 1 except for using the prepared cathode active substance 1-3 for use as the cathode active substance, and the charge/discharge test and the DSC measurement were performed.

Comparative Embodiment 6

In Comparative Embodiment 6, a test battery was manufactured by the same method as in Embodiment 1 except for mixing the prepared cathode active substances 1-4 and 2-10 at a mass ratio of 40:60 for use as the cathode active substance, and the charge/discharge test and the DSC measurement were performed.

Comparative Embodiment 7

In Comparative Embodiment 7, a test battery was manufactured by the same method as in Embodiment 1 except for mixing the prepared cathode active substances 1-2 and 2-9 at a mass ratio of 40:60 for use as the cathode active substance, and the charge/discharge test and the DSC measurement were performed.

Comparative Embodiment 8

In Comparative Embodiment 8, a test battery was manufactured by the same method as in Embodiment 1 except for mixing the prepared cathode active substances 1-1 and 2-1 at a mass ratio of 20:80 for use as the cathode active substance, and the charge/discharge test and the DSC measurement were performed.

Comparative Embodiment 9

In Comparative Embodiment 9, a test battery was manufactured by the same method as in Embodiment 1 except for mixing the prepared cathode active substances 1-1 and 2-1 at a mass ratio of 80:20 for use as the cathode active substance, and the charge/discharge test and the DSC measurement were performed.

Comparative Embodiment 10

In Comparative Embodiment 10, a test battery was manufactured by the same method as in Embodiment 1 except for mixing the prepared cathode active substances 1-1 and 2-13 at a mass ratio of 40:60 for use as the cathode active substance, and the charge/discharge test and the DSC measurement were performed.

TABLE 4

|  | First cathode active substance | Second cathode active substance | Mixing ratio | Capacity ratio | Calorific value ratio | Resistance ratio |
|---|---|---|---|---|---|---|
| Embodiment 1 | 1-1 | 2-1 | 40:60 | 1.016 | 0.877 | 1.048 |
| Embodiment 2 | 1-1 | 2-2 | 40:60 | 1.029 | 0.914 | 1.036 |
| Embodiment 3 | 1-1 | 2-3 | 40:60 | 1.001 | 0.840 | 1.060 |
| Embodiment 4 | 1-1 | 2-4 | 40:60 | 1.006 | 0.854 | 1.046 |
| Embodiment 5 | 1-1 | 2-5 | 40:60 | 1.019 | 0.886 | 1.034 |
| Embodiment 6 | 1-1 | 2-6 | 40:60 | 1.002 | 0.808 | 1.056 |
| Comp. Embodiment 1 | 1-2 | — | 100:0 | 1.000 | 1.000 | 1.000 |
| Comp. Embodiment 2 | 1-1 | — | 100:0 | 1.057 | 1.154 | 1.000 |
| Comp. Embodiment 3 | — | 2-1 | 0:100 | 0.981 | 0.808 | 1.084 |
| Comp. Embodiment 4 | 1-1 | 2-7 | 40:60 | 0.953 | 0.712 | 1.085 |

TABLE 5

| | First cathode active substance | Second cathode active substance | Mixing ratio | Capacity ratio | Calorific value ratio | Resistance ratio |
|---|---|---|---|---|---|---|
| Embodiment 7 | 1-2 | 2-1 | 40:60 | 1.030 | 0.913 | 1.048 |
| Embodiment 8 | 1-3 | 2-1 | 40:60 | 1.015 | 0.902 | 1.052 |
| Embodiment 9 | 1-2 | 2-8 | 40:60 | 1.017 | 0.926 | 1.081 |
| Embodiment 10 | 1-2 | 2-9 | 40:60 | 1.014 | 0.892 | 1.050 |
| Embodiment 11 | 1-2 | 2-10 | 40:60 | 1.002 | 0.887 | 1.048 |
| Comp. Embodiment 5 | 1-3 | — | 100:0 | 1.000 | 1.000 | 1.000 |
| Comp. Embodiment 6 | 1-4 | 2-10 | 40:60 | 0.957 | 0.662 | 1.076 |
| Comp. Embodiment 7 | 1-2 | 2-11 | 40:60 | 0.969 | 0.801 | 1.061 |

TABLE 6

| | First cathode active substance | Second cathode active substance | Mixing ratio | Capacity ratio | Calorific value ratio | Resistance ratio |
|---|---|---|---|---|---|---|
| Embodiment 12 | 1-1 | 2-1 | 30:70 | 1.010 | 0.833 | 1.056 |
| Embodiment 13 | 1-1 | 2-1 | 50:50 | 1.023 | 0.928 | 1.040 |
| Embodiment 14 | 1-1 | 2-1 | 70:30 | 1.030 | 0.992 | 1.024 |
| Comp. Embodiment 2 | 1-1 | — | 100:0 | 1.057 | 1.154 | 1.000 |
| Comp. Embodiment 3 | — | 2-1 | 0:100 | 0.981 | 0.808 | 1.084 |
| Comp. Embodiment 8 | 1-1 | 2-1 | 20:80 | 0.997 | 0.785 | 1.064 |
| Comp. Embodiment 9 | 1-1 | 2-1 | 80:20 | 1.044 | 1.059 | 1.016 |

TABLE 7

| | First cathode active substance | Second cathode active substance | Mixing ratio | Capacity ratio | Calorific value ratio | Resistance ratio |
|---|---|---|---|---|---|---|
| Embodiment 15 | 1-1 | 2-12 | 40:60 | 1.013 | 0.861 | 1.066 |
| Comp. Embodiment 10 | 1-1 | 2-13 | 40:60 | 0.989 | 0.851 | 1.108 |

Tables 4 to 7 illustrate respective capacity ratios, calorific value ratios, and resistance ratios with respect to Embodiments 1 to 15 and Comparative Embodiments 1 to 10 described above.

In Embodiments 1 to 6, Embodiments 12 to 15, Comparative Embodiments 1 to 4, and Comparative Embodiments 8 to 10, Tables 4 to 7 illustrate values obtained by dividing the obtained values of an initial discharge capacity by a value of an initial discharge capacity in Comparative Embodiment 1. Further, in Embodiments 7 to 11 and Comparative Embodiments 5 to 7, Tables 4 to 7 illustrate values obtained by dividing the obtained values of an initial discharge capacity by a value of an initial discharge capacity in Comparative Embodiment 5.

In Embodiments 1 to 6, Embodiments 12 to 15, Comparative Embodiments 1 to 4, and Comparative Embodiments 8 to 10, Tables 4 to 7 illustrate values obtained by dividing the obtained values of a calorific value by a value of an initial discharge capacity in Comparative Embodiment 1. Further, in Embodiments 7 to 11 and Comparative Embodiments 5 to 7, Tables 4 to 7 illustrate values obtained by dividing the obtained values of a calorific value by a value of an initial discharge capacity in Comparative Embodiment 5.

In Embodiments 1 to 6, Embodiments 12 to 15, Comparative Embodiments 1 to 4, and Comparative Embodiments 8 to 10, Tables 4 to 7 illustrate values obtained by dividing the obtained values of an electrode resistance by a value of an initial discharge capacity in Comparative Embodiment 1. Further, in Embodiments 7 to 11 and Comparative Embodiments 5 to 7, Tables 4 to 7 illustrate values obtained by dividing the obtained values of an electrode resistance by a value of an initial discharge capacity in Comparative Embodiment 5.

The result illustrated in Table 4 revealed that values of the discharge capacity in Embodiments 1 to 6 were larger than that in Comparative Embodiment 1. The reason is considered that the cathode active substances selected in Embodiments 1 to 6 have high content of Ni that is present in the transition metal layer.

Further, the result illustrated in Table 4 revealed that values of the calorific value in Embodiments 1 to 6 were smaller that in Comparative Embodiment 1. The reason is considered that Mo or W having the effect of reducing the amount of oxygen released from the cathode active substances at the time of elevating the temperature is added to the second cathode active substance. Further, resistance in Embodiments 1 to 6 rises; however, the percentage of rise was 10% or less.

On the other hand, the result illustrated in Table 4 revealed that in Comparative Embodiments 1 to 4, increase in the discharge capacity and reduction in the calorific value failed to be compatible with each other as compared with Comparative Embodiment 1. In Comparative Embodiment 2, since only the first cathode active substance was present, the calorific value was high. In Comparative Embodiment 3, since only the second cathode active substance was present, the discharge capacity was reduced. In Comparative Embodiment 4, since Mo was present at a mass rate of 8% in the second cathode active substance, the discharge capacity was reduced.

The result illustrated in Table 5 revealed that values of the discharge capacity in Embodiments 7 to 11 were larger than that in Comparative Embodiment 6. The reason is considered that the cathode active substances selected in Embodiments 7 to 11 have high content of Ni that is present in the transition metal layer.

Further, the result illustrated in Table 5 revealed that values of the calorific value in Embodiments 7 to 11 were smaller than that in Comparative Embodiment 5. The reason is considered that Mo or W having the effect of reducing the amount of oxygen released from the cathode active substances at the time of elevating the temperature is added to the second cathode active substance. Further, resistance in Embodiments 7 to 11 rises; however, the percentage of rise was 10% or less.

On the other hand, the result illustrated in Table 5 revealed that in Comparative Embodiments 5 to 7, increase in the discharge capacity and reduction in the calorific value failed to be compatible with each other as compared with Comparative Embodiment 5. In Comparative Embodiment 6, since the N content of the first cathode active substance is reduced as low as 50%, the discharge capacity is low. In Comparative Embodiment 7, since the N content of the second cathode active substance is reduced as low as 60%, the discharge capacity is low. To the second cathode active substance, Mo or W having the effect of reducing the amount of oxygen released from the cathode active substance at the time of elevating the temperature is added, and therefore, the second cathode active substance has excellent heat stability. For this reason, the content of Ni can be elevated. In order that high discharge capacity and high safety may be compatible with each other, the Ni content of the first cathode active substance is made higher than that of the cathode material and the second cathode active substance having added thereto Mo or W is required.

The results illustrated in Tables 4 and 6 revealed that values of the discharge capacity in Embodiment 1 and Embodiments 12 to 14 were larger than that in Comparative Embodiment 1. The reason is considered that the cathode active substances selected in Embodiment 1 and Embodiments 12 to 14 have high content of Ni that is present in the transition metal layer.

Further, the results illustrated in Tables 4 and 6 revealed that values of the calorific value in Embodiment 1 and Embodiments 12 to 14 were smaller than that in Comparative Embodiment 1. The reason is considered that Mo or W having the effect of reducing the amount of oxygen released from the cathode active substances at the time of elevating the temperature is added to the cathode active substance in Embodiment 1 and Embodiments 12 to 14. Further, resistance in Embodiment 1 and Embodiments 12 to 14 rises; however, the percentage of rise was 10% or less.

On the other hand, in Comparative Embodiments 2, 3, 8, and 9, increase in the discharge capacity and reduction in the calorific value failed to be compatible with each other as compared with Comparative Embodiment 1. In Comparative Embodiments 2 and 8, since a ratio of the first cathode active substance occupied in the mixing ratio was high, the calorific value increases. On the other hand, in Comparative Embodiments 3 and 9, since a ratio of the second cathode active substance occupied in the mixing ratio was high, the discharge capacity was reduced.

Further, the results illustrated in Tables 4 and 7 revealed that as compared with Comparative Embodiment 1, increase in the discharge capacity and reduction in the calorific value are compatible with each other and the percentage of rise in the resistance was 10% or less in Embodiments 1 and 15.

On the other hand, the result illustrated in Table 7 revealed that as compared with Comparative Embodiment 1, the percentage of rise in the resistance was as large as 10.8% in Comparative Embodiment 10. The reason is considered that since a secondary particle size of the second cathode active substance is large, the percentage of rise in the resistance cannot be reduced.

Figure 2:
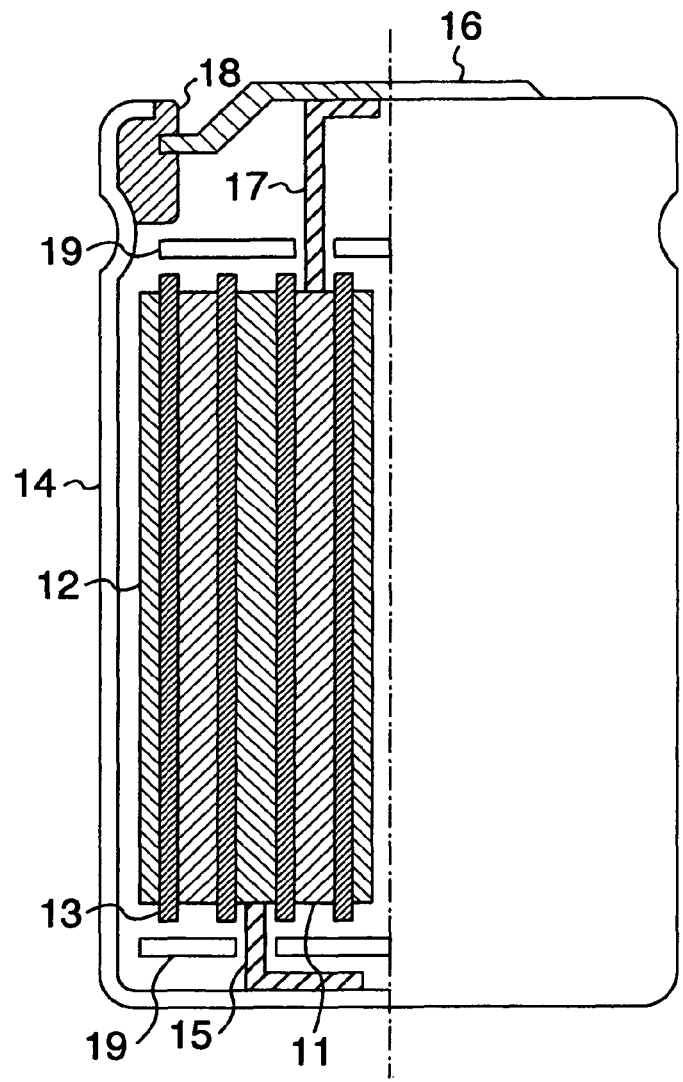
FIG. 2 is a schematic cross sectional view illustrating a lithium ion secondary battery.

FIG. 2 is a schematic cross sectional view illustrating the lithium ion secondary battery.

In the lithium ion secondary battery illustrated in FIG. 2, a separator 13 is interposed between a cathode plate 11 obtained by coating both surfaces of a current collector with cathode materials and an anode plate 12 obtained by coating both surfaces of the current collector with anode materials. These cathode plate 11, anode plate 12, and separator 13 are wound, thus forming a wound body.

The thus-formed wound body is inserted into a battery can 14. Then, the anode plate 12 is electrically connected to the battery can 14 through an anode lead piece 15.

Further, a packing 18 is formed between the battery can 14 and a sealing lid portion 16. Then, the cathode plate 11 is electrically connected to the sealing lid portion 16 through a cathode lead piece 17.

In addition, the wound body is insulated by an insulating plate 19.

When the above-described materials according to the embodiment are used as the cathode materials of the lithium ion secondary battery, the lithium ion secondary battery excellent in the discharge capacity, the output, and the heat stability can be provided.

The proposed cathode material of the present invention is prospective as a material of a lithium ion secondary battery for plug-in hybrid cars.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A cathode material for a lithium ion secondary battery, comprising:
    a first cathode active substance represented by a compositional formula: $Li_{x1}Ni_{a1}Mn_{b1}Co_{c1}O_2$ (in which $0.2 \leq x1 \leq 1.2$, $0.6 \leq a1 \leq 0.9$, $0.05 \leq b1 \leq 0.3$, $0.05 \leq c1 \leq 0.3$, and $a1+b1+c1=1.0$); and
    a second cathode active substance represented by a compositional formula: $Li_{x2}Ni_{a2}Mn_{b2}CO_{c2}M_dO_2$ (in which $0.2 \leq x2 \leq 1.2$, $0.7 \leq a2 \leq 0.9$, $0.05 \leq b2 \leq 0.3$, $0.05 \leq c2 \leq 0.3$, M=Mo, W, $0 \leq d \leq 0.06$, and $a2+b2+c2+d=1.0$),
    wherein an amount of the first cathode active substance contained in the cathode material is set to 30 to 70% by mass.

2. The cathode material according to claim 1, wherein an average secondary particle size of the first cathode active substance is larger than that of the second cathode active substance.

3. The cathode material according to claim 1, wherein Ni content of the first cathode active substance is smaller than or equal to that of the second cathode active substance.

4. The cathode material according to claim 1, wherein an average secondary particle size of the second cathode active substance is smaller than or equal to one half of that of the first cathode active substance.

5. The cathode material according to claim 1, wherein the Ni content a1 of the first cathode active substance is $0.7 \leq a1 \leq 0.8$, and the Ni content a2 of the second cathode active substance is $0.75 \leq a2 \leq 0.8$.

6. A lithium ion secondary battery comprising:
a cathode capable of occluding and discharging lithium;
an anode capable of occluding and discharging lithium;
a separator located between the cathode and the anode; and
a non-aqueous electrolyte located between the cathode and the anode,
wherein the cathode has the cathode material for a lithium ion secondary battery according to claim 1.

7. The cathode material according to claim 1, wherein a mixing ratio of the mass of the first cathode active substance to the mass of the second cathode active substance contained in the cathode material is in a range of 30:70 to 70:30.

* * * * *